Figure 1:
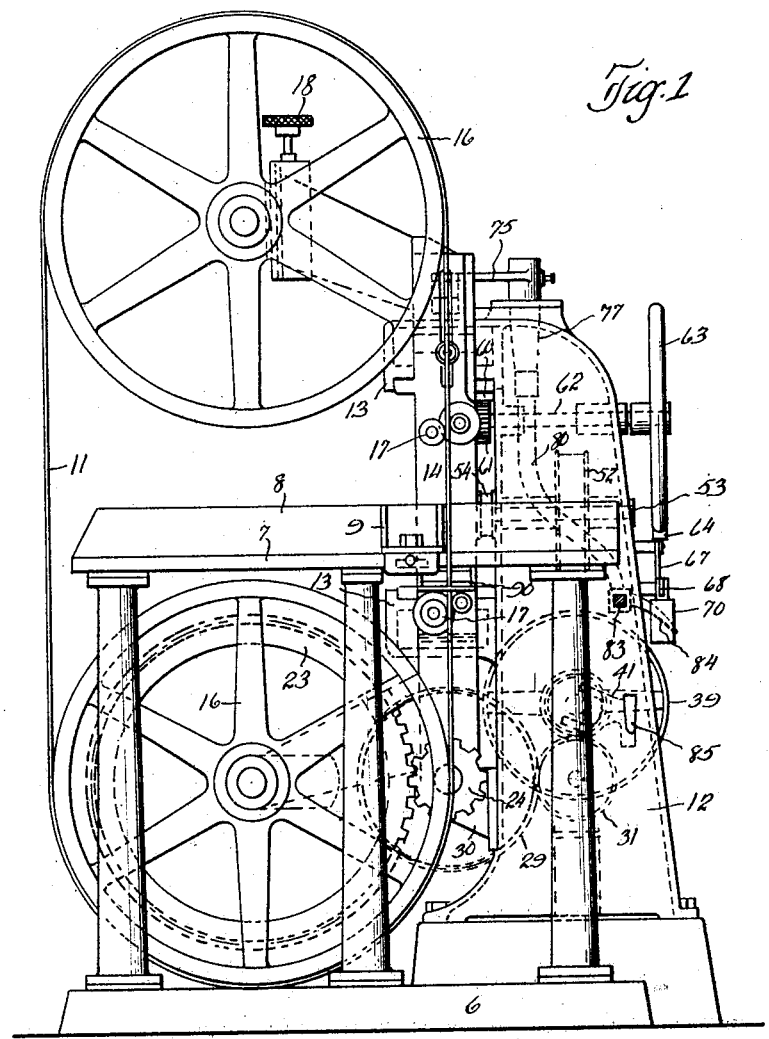

G. C. HUNTER.
BAND SAW MACHINE.
APPLICATION FILED APR. 7, 1920.

1,381,418.

Patented June 14, 1921.
5 SHEETS—SHEET 1.

Inventor
George C. Hunter
By John A. Bonnhardt
Attorney

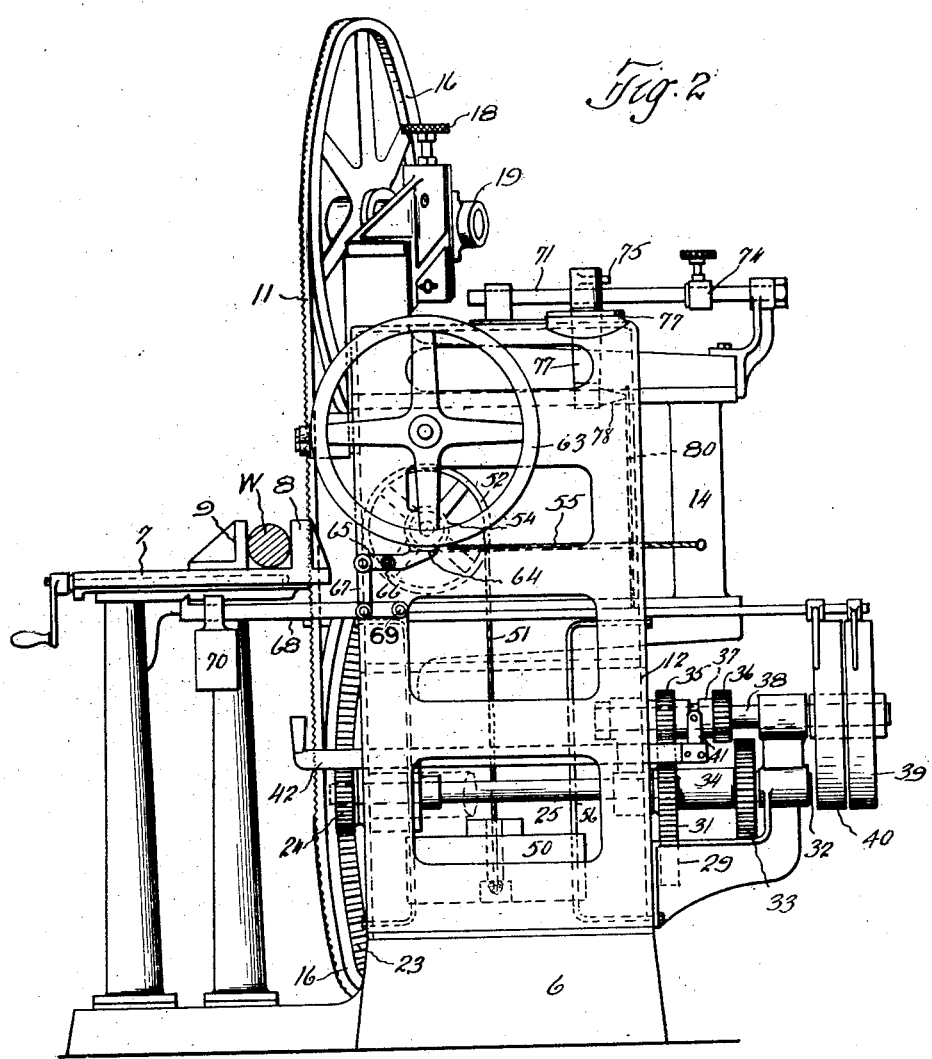

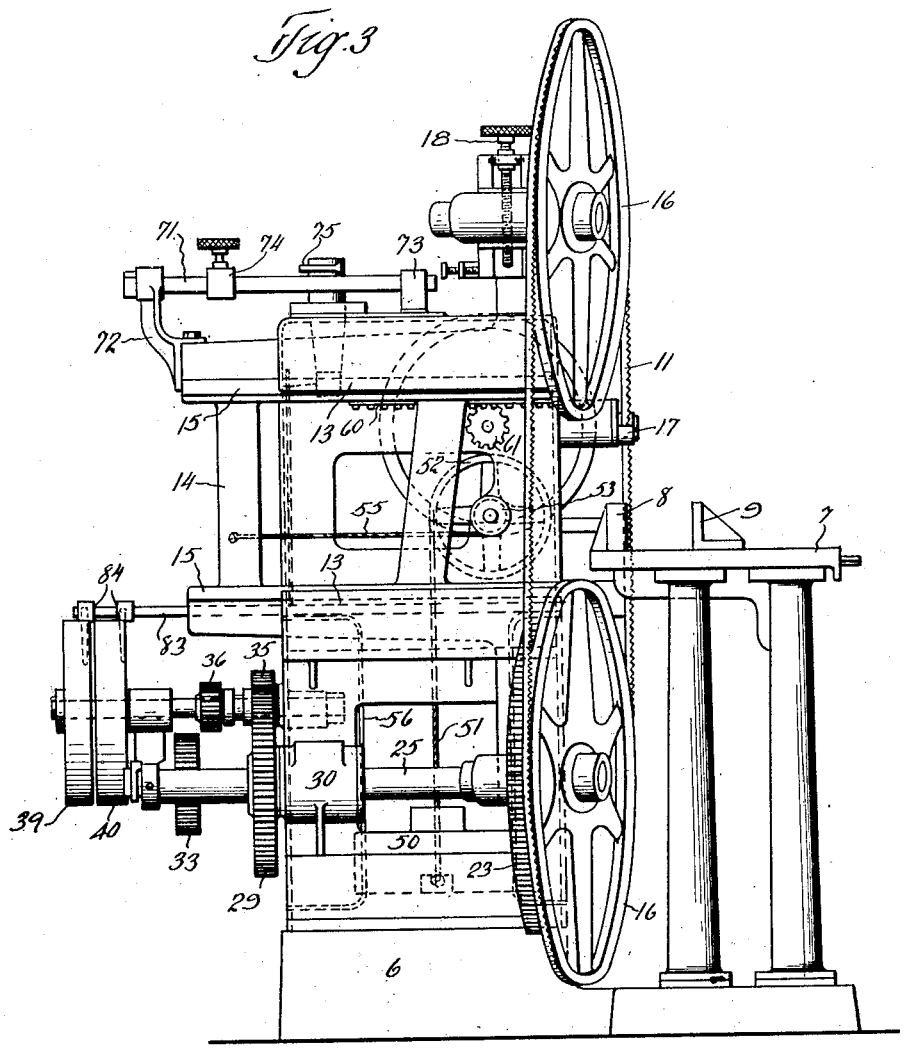

G. C. HUNTER.
BAND SAW MACHINE.
APPLICATION FILED APR. 7, 1920.
1,381,418.
Patented June 14, 1921.
5 SHEETS—SHEET 4
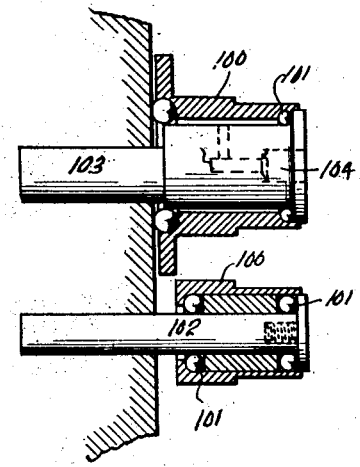
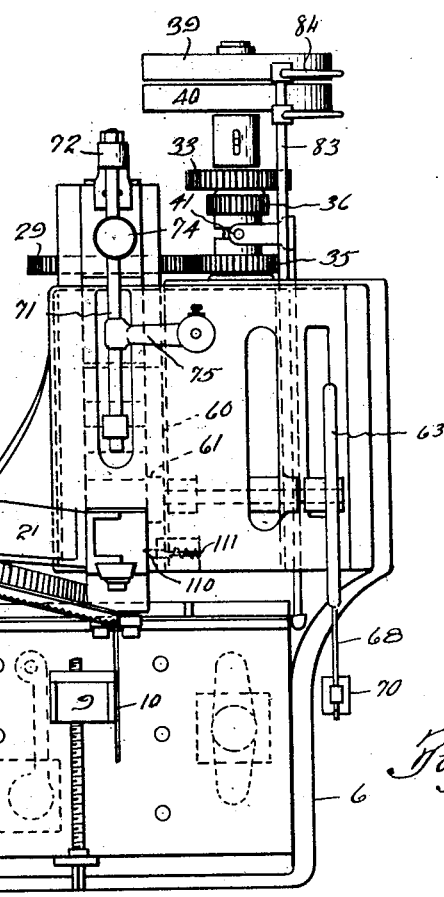
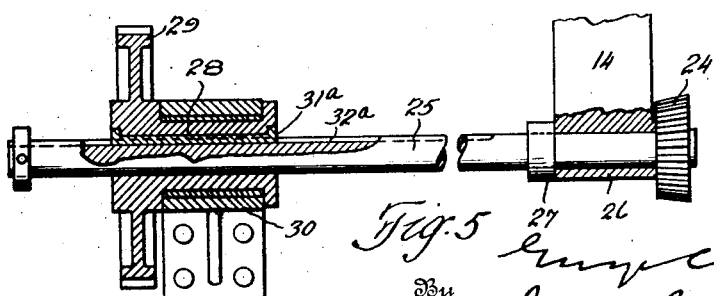

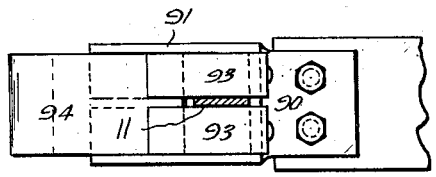
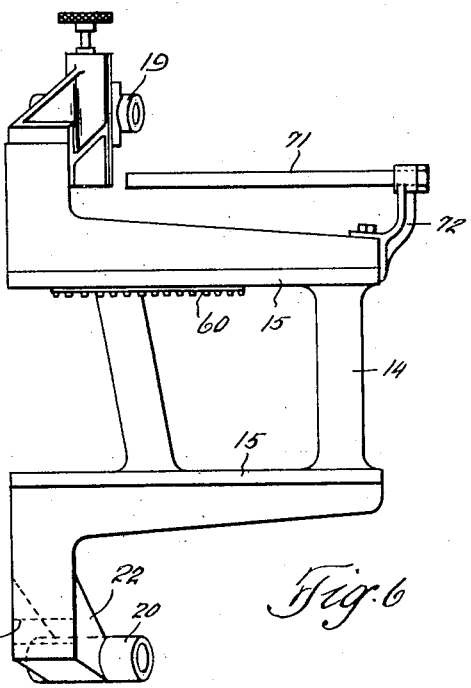
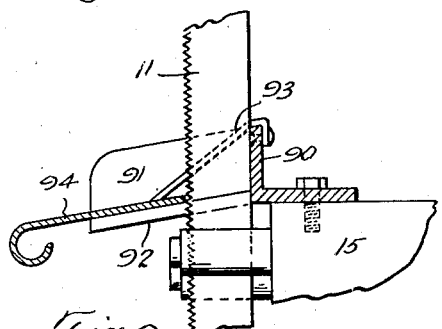
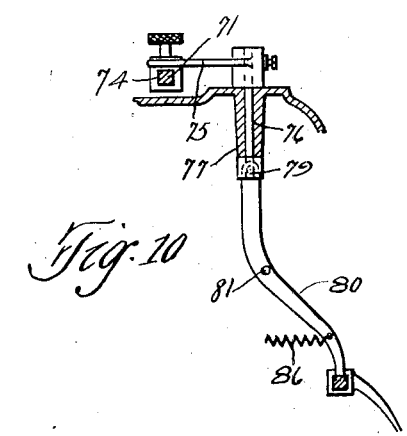
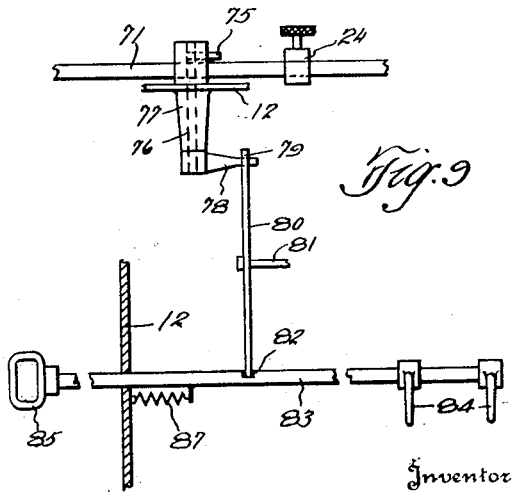

UNITED STATES PATENT OFFICE.

GEORGE C. HUNTER, OF NEW HAVEN, CONNECTICUT.

BAND-SAW MACHINE.

1,381,418.  Specification of Letters Patent.  Patented June 14, 1921.

Application filed April 7, 1920. Serial No. 371,836.

*To all whom it may concern:*

Be it known that I, GEORGE C. HUNTER, a citizen of the United States, residing at New Haven, in the county of New Haven and State of Connecticut, have invented certain new and useful Improvements in Band-Saw Machines, of which the following is a specification.

In my U. S. Patent #1084801 dated January 20, 1914, there is disclosed a band saw machine of the kind known as the straight line type, in which the work is held on a table and the band saw is advanced to the work, the saw pulleys being mounted on a frame which slides horizontally in a straight line in guides mounted on a column beside the table, the pulleys being set at an angle to the line of movement, so that the return run of the saw is spaced or set back from the cutting run, so that the latter will cut through the work before the former reaches the work.

The present invention embodies a number of improvements on the machine described in said patent.

One of the improvements relates to the means for driving the saw. The drive is effected through the lower band pulley, and in the present case this pulley is mounted on a shaft which is slidable lengthwise to advance or retract the saw, the shaft being splined to a driving gear which includes a change speed arrangement for use when desired.

A further improvement relates to the means for feeding the frame forwardly for the cutting action of the saw, this feed to be effected by means of a weight and pulley device. A further improvement relates to the means for controlling the rate of feed, said means including a brake, the action of which may be adjusted to give a fast or slow feed.

A further improvement relates to the means for stopping the cut at any desired place, by means of an automatic stop arrangement which shifts the driving belt from a fast pulley to a loose pulley when the desired depth of cut is reached.

A further improvement relates to means for collecting dust from the saw and preventing the same from dropping on the gearing which drives the saw.

Various other details of improvement will appear from the following description and the accompanying drawings in which Figure 1 is a front elevation of the machine. Fig. 2 is a side elevation. Fig. 3 is an opposite side elevation. Fig. 4 is a plan. Fig. 5 is a detail in section of the shaft drive. Fig. 6 is a detail in side elevation of the sliding frame. Fig. 7 is a top view of the dust collector. Fig. 8 is a vertical section thereof. Fig. 9 is an elevation of the stop mechanism. Fig. 10 is a section thereof. Fig. 11 is a detail in section of the guide rolls.

Referring specifically to the drawings, 6 indicates a base on which the machine is mounted and this supports a table 7 with a back rest 8 against which the work indicated at W is clamped by a suitable adjustable chuck 9. The table and back board are slotted as indicated at 10 to permit the passage of the cutting run of the saw 11, the return run being located beyond the edge of the table.

The column 12 is mounted on the base behind the table, and supports upper and lower horizontal straight line guides 13 extending at a right angle to the front edge of the table, said guides being spaced apart vertically and facing each other, one being located at a sufficient height above the plane of the table, and the other being located slightly below the table top.

The saw carrying frame 14 has upper and lower slides 15 fitting in the guides 13 and may be slid back and forth to retract or advance the saw. The saw runs over the upper and lower band wheels or pulleys 16, the cutting run of the saw passing between pairs of upper and lower guide rollers 17, mounted on the frame 14, to present the saw in a plane parallel to the line of movement of the sliding frame and to correct the inclination due to the angularity of the axes of the band wheels with respect to said line of movement. The upper band wheel is adjustable by a screw 18 to adjust the tension of the saw, the band wheels being carried by bearing boxes 19 and 20 supported by brackets 21 and 22 at the top and bottom of the sliding frame. In these respects the construction may follow substantially the structure disclosed in said patent.

Lower band wheel 16 is the driven wheel, and carries a bevel gear 23 which meshes with a bevel pinion 24 on a shaft 25 supported by a bearing 26 in the lower arm of the frame 14, with a collar 27 on the shaft, whereby the shaft 25 will be moved lengthwise with the frame 14. The rear end of the shaft 25 works through the sleeve hub 28 of a gear 29 which is mounted in relatively fixed position on a bearing bracket 30 at the inner side of the column 12. The hub or sleeve of the gear has a spline $31^a$ which slides in a long key-way $32^a$ in the shaft 25, so that the shaft is driven while sliding movement is permitted. The gear 29 meshes with a gear 31 forming one of a set of speed changing gears, the gear 31 being mounted on a counter shaft 32 with a companion gear 33 connected to the gear 31 by a sleeve 34, and the gears 31 and 33 may be interchangeably engaged by the pinions 35 and 36 on a shifting sleeve 37 splined on the shaft 38 which carries the fast and loose pulleys 39 and 40 to which power may be applied by a suitable belt (not shown). The sleeve 37 is shifted by a yoke 41 connected to a shifting rod 42.

It will be seen that by the means described the lower band wheel may be driven at the desired speed and the shaft 25 will be carried back and forth as the saw frame is retracted or advanced.

For advancing the saw frame to feed the saw I provide a weight 50 connected by a cable 51 to a drum 52 on a shaft 53 mounted in the column 12 and this shaft carries a smaller drum 54 connected by a cable 55 to the frame 14, forming a differential windlass, the operation of which will serve to slide the frame 14 forwardly and carry the saw into the work. The weight 50 travels on guides 56 in the column. The upper bar 15 of the frame 14 is provided with a rack 60 which meshes with a pinion 61 on a shaft 62 supported in the column, the outer end of the shaft carrying a hand wheel 63 which also forms a brake wheel, being engaged by a shoe 64 on the upper arm of the brake lever 65 which is fulcrumed at 66 on the column and connected by a link 67 to a lever 68 which is fulcrumed at 69 and carries a weight 70 which may be adjusted along the lever to vary the pressure of the shoe 64 against the wheel 63 and consequently vary the resistance to the feed provided by the weight 50, and accordingly the speed at which the saw is fed into the work. To return the saw frame the hand wheel 63 may be turned by hand, which action also raises the weight, through the rack and pinion connection to the frame.

To stop the feed at any desired point, I provide a bar 71 carried by an arm 72 on the top of the sliding frame on the column. An adjustable stop collar 74 is mounted on this bar and is arranged to strike an arm 75 projected from a vertical rocker shaft 76 mounted in a bushing 77 set in the top of the column, and this shaft 76 carries at its lower end an arm 78 loosely connected at 79 to the upper end of a lever 80 which is pivoted on a pin 81 inside of the column and extends at its lower end in position to engage in a notch 82 in a belt shifting bar 83 having the usual fork 84 to engage the belt and being mounted to slide lengthwise in the column, and provided with a handle 85 at its front end, whereby the belt may be shifted by hand when desired. The spring 86 connected to the lever 80 tends to throw the lever into the notch 82, and a spring 87, connected to the shifter bar, tends to throw the belt to the loose pulley 40.

When the shifter rod 83 is pushed back to start the drive the toe of the lever 80 will engage in the notch 82 and the drive will continue until the stop 74 strikes the arm 75 which will turn the rocker 76 and swing the lever 80 out of the notch, and the spring 87 will then pull the rod 83 and shift the belt to the loose pulley, and the machine will stop, and remain so until the saw frame is retracted and the belt shifter again pushed back, when the lever 80 will again engage in the notch to repeat the operation.

To collect saw dust and to prevent same from falling on the pinion 24 and gears below, I provide an attachment consisting of a bracket 90 (see Figs. 7 and 8) fixed to the lower arm 15 of the saw frame, just above the lower guide rolls 17, and this bracket supports a trough-shaped plate or case 91 having a slot at 92 to accommodate the saw, and also supports a pair of steel scrapers 93 located in contact with opposite sides of the saw. These are inclined downwardly and outwardly and are fastened to the upper flange of the bracket, and they discharge onto a removable bottom plate 94 which may be slid in and out of the open end of the casing 91, and removed to dislodge any saw-dust collecting thereon.

The guide rolls are shown in detail in Fig. 11. Each roll comprises a sleeve 100 mounted on ball bearings 101 between the sleeve and a pin 102 set into the wall of the arm 15 of the frame. One pin is adjustable to vary the distance between the rollers, said pin having an eccentric shank 103 which can be turned in its socket in the frame, or set in at different angles, to vary the clearance between the rollers. Each pin is tapped and bored, as indicated at 104, for oil.

The various improvements above described increase the simplicity and efficiency of the machine.

To provide a lock for holding back the frame when not in use I provide a spring latch 110 which will engage in the frame 14 and which may be slid back by knob 111 connected thereto, the latch being mounted on the column beside one of the guides.

I claim:

1. In a band saw machine, the combination of a reciprocating frame, a band saw and its wheels carried by the frame, and means to drive one of said wheels, including a sliding shaft carried by the frame and geared to the wheel and means to drive said shaft and permit the slide thereof.

2. In a band saw machine, the combination of a reciprocating frame, a band saw and its wheels carried by the frame, and means to drive one of said wheels, including a sliding shaft carried by the frame and geared to the wheel, and a relatively stationary driven gear mounted in a bearing on the frame of the machine and splined to the shaft.

3. In a band saw machine, the combination of a reciprocating frame, a band saw and its wheels, brackets on the frame supporting said wheels, a gear fixed to one of said wheels, a shaft mounted in a bearing on the frame, a pinion on one end of the shaft in mesh with said gear, said shaft being slidable with the gear, and means to drive the shaft in all of its positions.

4. In a band saw machine of the type in which the saw is carried by a sliding frame, the combination of a weight and pulley mechanism connected to the frame to feed the same, a rack carried by the frame, a shaft provided with a hand wheel, and with a pinion engaging said rack, to retract said frame, and means to brake the movement of the shaft, to delay the feed.

5. In a band saw machine of the type in which the saw is carried by a sliding frame, the combination of a weight and pulley mechanism connected to the frame, to feed the same, a rack carried by the frame, and a shaft provided with a hand wheel, and with a pinion engaging said rack, to retract said frame, and means to brake the movement of the shaft, to delay the feed, said means including a brake shoe pressing against the hand wheel and a weighted lever connected to said shoe.

6. In a band saw machine of the type in which the saw is carried by the sliding frame, the combination with means to drive the saw, of a belt shifter coöperating with said means and including a notched bar, a lever engageable in said notch, a rod carried by said frame, an adjustable stop collar on the rod, and a rocker having an arm projecting into the path of the collar and another arm connected to the lever.

7. The combination with a band saw, of a pair of inclined scrapers fitting against opposite sides of the saw, to dislodge sawdust therefrom, and a casing supporting said scrapers and into which they discharge, and having a slot through which the saw runs, said casing being provided with a removable bottom plate.

8. A guide for band saws, comprising a rotary sleeve, and a pin supporting the same, said pin having an eccentric shank which may be turned in the saw frame, to vary the set of the sleeve.

9. In a band saw machine, the combination of a reciprocating frame, a band saw and its wheels, carried by the frame, and means to drive one of said wheels, including a sliding shaft carried by the frame and geared to the wheel, and a relatively stationary driven gear mounted in a bearing on the frame of the machine and splined to the shaft, and a change speed gearing driving said driven gear.

In testimony whereof, I do affix my signature in presence of two witnesses.

GEORGE C. HUNTER.

Witnesses:
C. W. WILCOX,
LEROY R. MYERS.